United States Patent [19]

Soshi et al.

[11] Patent Number: 5,555,061
[45] Date of Patent: Sep. 10, 1996

[54] CAMERA WITH IMPROVED POSITIONING OF VIBRATION DETECTING SENSORS THEREIN

[75] Inventors: Isao Soshi, Tokyo; Hidenori Miyamoto, Urayasu; Seijiro Noda, Yokohama, all of Japan

[73] Assignee: Nikon Corporation, Tokyo, Japan

[21] Appl. No.: 311,039

[22] Filed: Sep. 26, 1994

[30] Foreign Application Priority Data

Sep. 27, 1993 [JP] Japan ................................. 5-262947

[51] Int. Cl.⁶ .................................................. G03B 17/02
[52] U.S. Cl. ......................................... 354/288; 348/208
[58] Field of Search .................................. 354/286, 288, 354/432; 348/208

[56] References Cited

U.S. PATENT DOCUMENTS 4,623,930  11/1986  Oshima et al. .
5,084,724   1/1992  Maeno ..................................... 354/430
5,210,563   5/1993  Hamada et al. ....................... 354/400
5,460,341  10/1995  Katsuyama et al. .

*Primary Examiner*—Monroe H. Hayes

[57] ABSTRACT

A camera having vibration detecting sensors and a vibration correction function, with improved positioning of the vibration detecting sensors to reduce noise resulting from vibration components in the roll direction of the camera. The camera includes a retaining member which supports the image storage material at the photographic image plane exposure aperture and a vibration detecting sensor arranged to the rear of the camera in relation to the retaining member and located approximately at a center position along the width of the camera.

10 Claims, 3 Drawing Sheets

CAMERA WITH IMPROVED POSITIONING OF VIBRATION DETECTING SENSORS THEREIN

BACKGROUND OF THE INVENTION

1. Field of the Invention

The present invention relates to a camera having a vibration correction function which utilizes vibration detecting sensors and, more particularly, to a camera with improved positioning of the vibration detecting sensors.

2. Description of the Related Art

Vibration can occur in the yaw and pitch directions of a camera and vibration detecting sensors are used to detect such vibration. When angular acceleration detection sensors are used as vibration detecting sensors for detecting vibration in a camera's yaw and pitch directions, the angular acceleration detection sensors are typically arranged in the grip of the camera. The grip is separated from the center of the camera body and, therefore, the angular acceleration detection sensors are also separated from the camera body. This type of arrangement is described in Japanese Patent Publication No. HEI 5-134287.

However, vibration also occurs in the roll direction of the camera and angular acceleration detection sensors utilized for detecting vibration in the yaw and pitch directions can undesirably detect vibration in the roll direction. This "undesirably detected" roll vibration acts as noise in the yaw and pitch directions, thereby affecting the accuracy of detection in the intended yaw and pitch directions.

Moreover, vibration in the roll direction becomes larger when angular acceleration detection sensors are arranged at positions which are separated from the center of the camera body (such as in the grip). Also, the angular acceleration detection sensors undesirably detect vibration in the roll direction when the sensors are attached at even a slight angle in relation to the detection axes of the pitch or yaw directions, respectively. As a result, angle adjustment and angle amount inspection must be performed when attaching angular acceleration detection sensors in the camera during the assembly process. In addition, arranging of angular acceleration sensors and other types of vibration detecting sensors in a position separated from the center of the camera body disadvantageously increases the width of the camera.

SUMMARY OF THE INVENTION

Accordingly, it is an object of the present invention to provide improved positioning of vibration detecting sensors, such as angular acceleration detection sensors, in a camera.

It is a further object of the present invention to reduce the vibration noise component in the roll direction resulting from the positioning of the vibration detecting sensors in a camera.

It is also an object of the present invention to reduce the roll direction noise component detected by vibration detecting sensors utilized for detecting vibration in the pitch and yaw directions in a camera.

It is a still further object of the present invention to eliminate the need to inspect and adjust an installation angle of a vibration detecting sensor when the vibration detecting sensor is initially installed in the camera.

It is also an object of the present invention to reduce the width of the camera.

Additional objects and advantages of the invention will be set forth in part in the description which follows and, in part, will be obvious from the description, or may be learned by practice of the invention.

Objects of the present invention are achieved by providing a camera which photographs an image onto an image storage material by exposing the image storage material through a photographic image plane exposure aperture. The camera comprises a retaining member which supports the image storage material at the photographic image plane exposure aperture and a vibration detecting sensor arranged to the rear of the camera in relation to the retaining member and located approximately at a center position along the width of the camera. The camera could further comprise first and second vibration detecting sensors, the first vibration detecting sensor being an angular acceleration detection sensor which detects angular acceleration in a first direction and the second vibration detecting sensor being an angular acceleration detection sensor which detects angular acceleration in a second direction, the second direction being perpendicular to the first direction.

BRIEF DESCRIPTION OF THE DRAWINGS

These and other objects and advantages of the present invention will become apparent and more readily appreciated from the following description of the preferred embodiments, taken in conjunction with the accompanying drawings of which.

DESCRIPTION OF THE PREFERRED EMBODIMENTS

Figure 1:
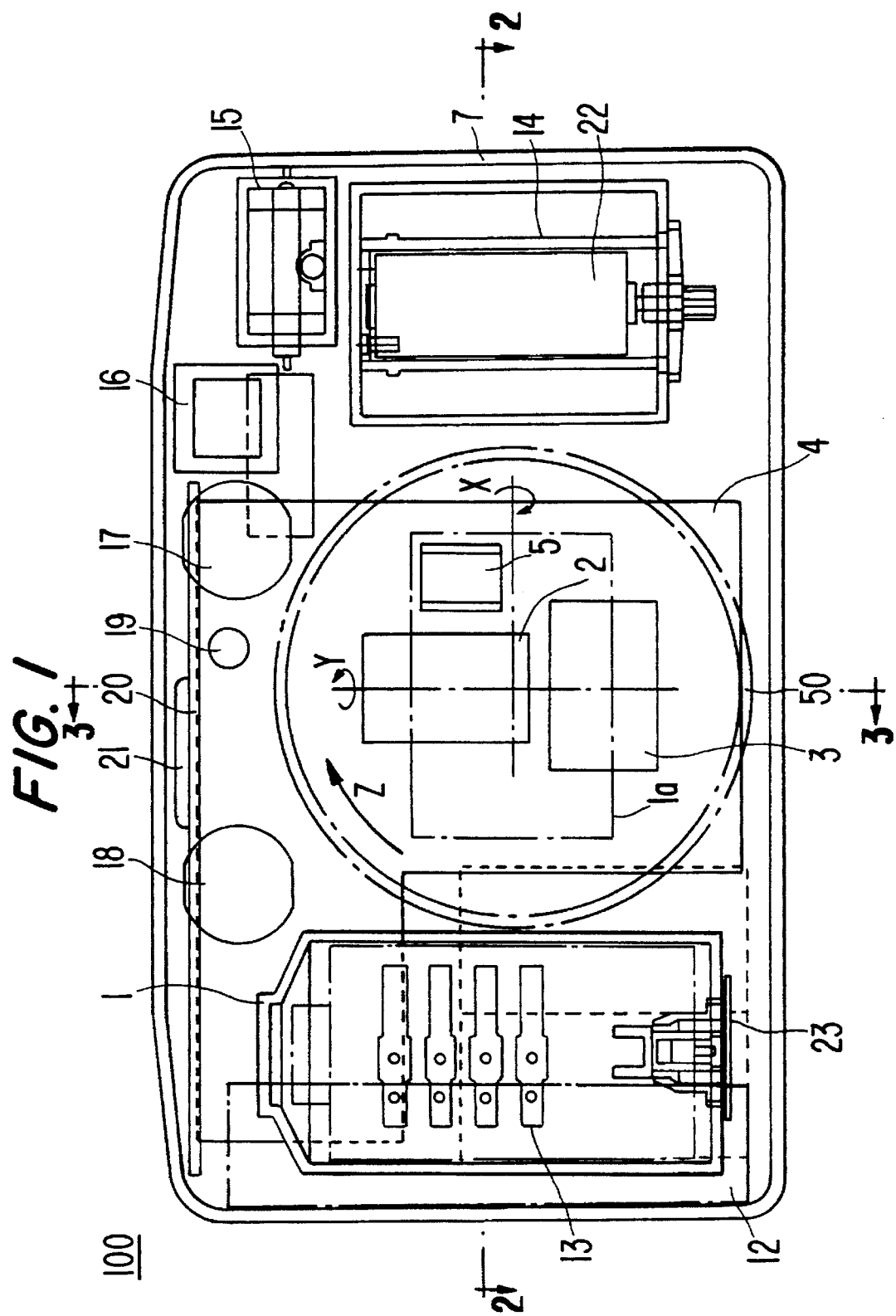
FIG. 1 is a diagram illustrating a front view of a still camera with a vibration correction function according to an embodiment of the present invention.

Reference will now be made in detail to the present preferred embodiments of the present invention, examples of which are illustrated in the accompanying drawings, wherein like reference numerals refer to like elements throughout.

Referring now to FIG. 1, the X direction represents the yaw direction, the Y direction represents the pitch direction and the Z direction represents the roll direction of a camera 100. Camera 100 has a camera body 1 and a cover case 7. Cover case 7 holds the photographic lens barrel 50 in the center of camera 100. Film (not illustrated) is exposed to light from a subject (not illustrated) passing through photographic lens barrel 50 and a photographic image plane exposure aperture 1a. Angular acceleration detection sensors 2 and 3 detect vibration in the pitch and yaw directions, respectively, and are mounted on a common board 4. Angular acceleration detection sensors 2 and 3 are positioned in the vicinity of photographic image plane exposure aperture 1a and to the rear of camera 100 in relation to the film. A CPU 5 controls angular acceleration detection sensors 2 and 3. Photographic lens barrel 50 is preferably a zoom lens. Viewed from the front-side of camera body 1 (photographic lens side), as shown in FIG. 1, the left side of camera 100 has a grip which is shaped so that a photographer can easily hold camera 100 by holding the grip. A strobe condenser 12 and a DX contact spring 13 for reading the ISO speed of film are positioned on the same side of camera 100 as the grip.

A rewind fork 23 rewinds the film and is arranged on the upper side of photographic lens barrel 50. Camera 100 also includes a photometric element 19, an infrared light projecting device 17 and an infrared light receiving device 18. Photometric element 19, infrared light projecting device 17 and infrared light receiving device 18 are well-known measurement devices used for autofocus operations. A CPU 21 controls camera operations. Spool 14 holds film and includes a film feed motor 22. A strobe emitter 15 is arranged above spool 14. FIG. 1 also illustrates a main board 20 and a viewfinder 16.

Figure 2:
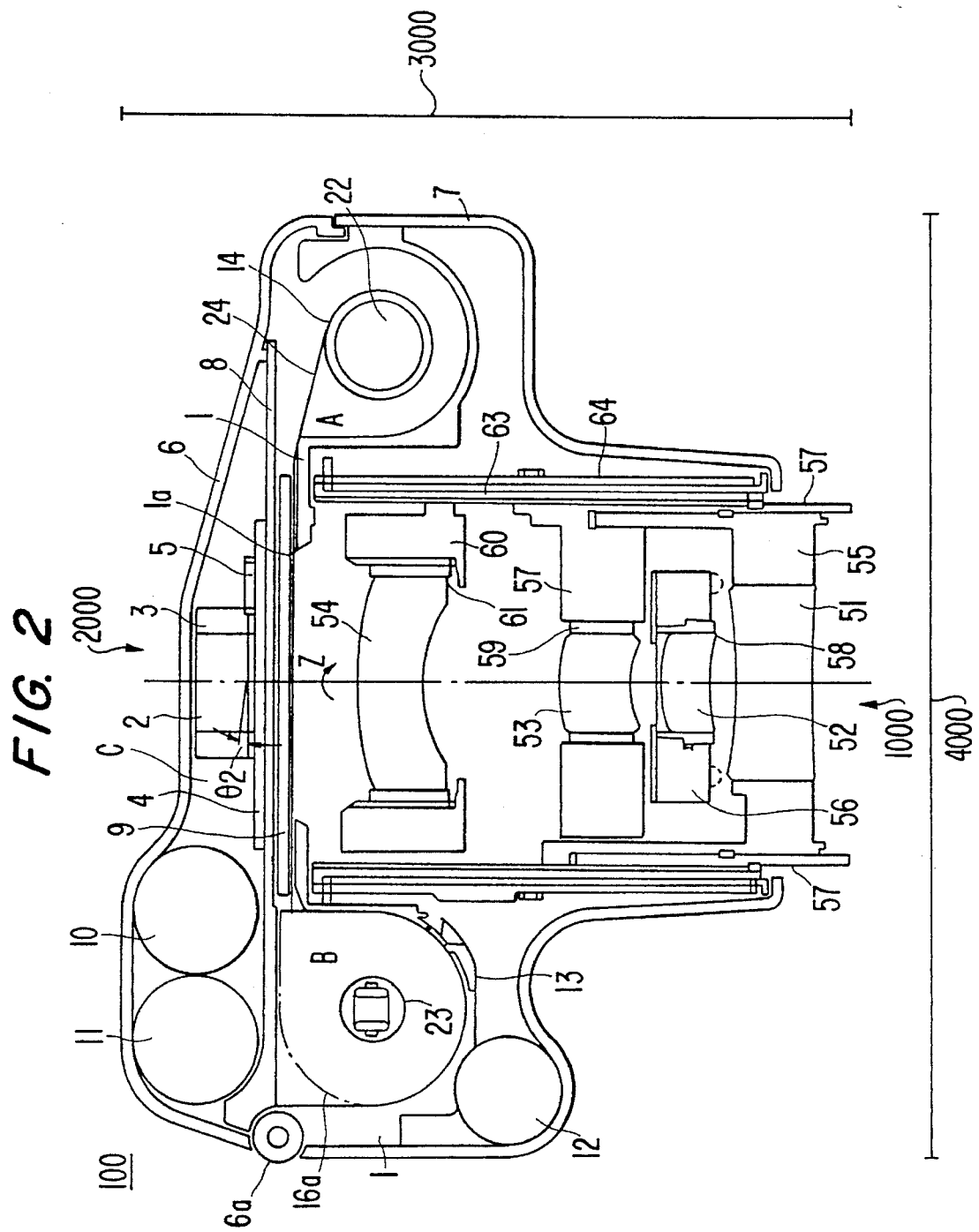
FIG. 2 is a diagram of an upper cross-sectional view, along line 2—2 in FIG. 1, of a still camera with a vibration correction function according to an embodiment of the present invention.

Referring now to FIG. 2, a film cartridge 16a is inserted into a cartridge chamber B. Strobe condenser 12 is arranged on a section of the front side which protrudes the most. DX contact spring 13 reads the ISO speed of photographic film 24 in film cartridge 16a. A rear cover 6 is secured to camera body 1 by a hinge 6a so that rear cover 6 can open and close. CPU 5 controls angular acceleration detection sensors 2 and 3. Although not illustrated in FIG. 2, photometric element 19, infrared light projecting device 17, infrared light receiving device 18, CPU 21, main board 20 and viewfinder block 16 are positioned above photographic lens barrel 50.

Viewed from the front of camera 100, as illustrated in FIG. 2, the right side of camera 100 includes a spool chamber A which includes film feed motor 22 built into it. Batteries 10 and 11 provide power to camera 100. A space C is formed by the installation of angular acceleration detection sensors 2 and 3 with the rear cover 6 closed. Angular acceleration detection sensors 2 and 3 are arranged so that they fit inside camera 100 with rear cover 6 closed, without increasing the width of camera 100. A pressure plate 9 maintains flatness of film 24 by pressing film 24 against the photographic image plane exposure aperture 1a. Pressure plate 9 is not limited to being a "plate" and can be virtually any type of "retaining member" which would support film 24 against photographic image plane exposure aperture 1a. Common board 4 and pressure plate 9 are installed on a parent board 8. Parent board 8 is attached to rear cover 6. In FIG. 2, angular acceleration detection sensors 2 and 3 are positioned at an angle $\Theta 2$ with respect to common board 4.

Lens groups 51, 52, 53 and 54 are individual photographic lens systems which collectively constitute a photographic optical system. Lens group 52 and lens group 53 are combined so that they move in unison in the direction of the optical axis. Lens chamber 55 holds lens group 51. A shutter drive mechanism 56 for a shutter driver (not illustrated) is attached to a lens board 57. Lens board 57 comprises a built-in vibration compensating lens shift mechanism built (not illustrated). A lens chamber 58 is secured to shutter drive mechanism 56 and holds lens group 52. A lens board 60 holds lens group 54. A lens chamber 59 holds lens group 53 and a lens chamber 61 holds lens group 54. A cam tube 64 holds lens groups 51–54. FIG. 2 also illustrates fixed tube 63.

FIG. 2 indicates the "front" 1000 and "rear" 2000 of camera 100. "Front" and "rear" are terms which are useful for defining the positional relationship of elements within camera 100. For example, lens group 51 can be described as being arranged or positioned to the "front" of the camera in relation to pressure plate 9 since lens group 51 is closer to the front of the camera than pressure plate 9. Similarly, in FIG. 2, angular acceleration detection sensors 2 and 3 are arranged to the rear of pressure plate 9. FIG. 2 also indicates the "length" 3000 of camera 100 which is defined as the extension of camera 100 from the front to the rear. FIG. 2 also indicates the "width" 4000 of camera 100 which is defined as the extension of camera 100 along a direction which is perpendicular to the length. Therefore, in FIG. 2, pressure plate 9 substantially extends along the width of camera 100. Also, each element in camera 100 is positioned at a specific point along the length of camera 100 and a specific point along the width of camera 100. For example, angular acceleration detection sensors 2 and 3 are positioned at a specific point along the length of camera 100. Also, angular acceleration detection sensors 2 and 3 can be described as positioned at substantially a center position of camera 100 in relation to the width of camera 100 at the specific point along the length.

Figure 3:
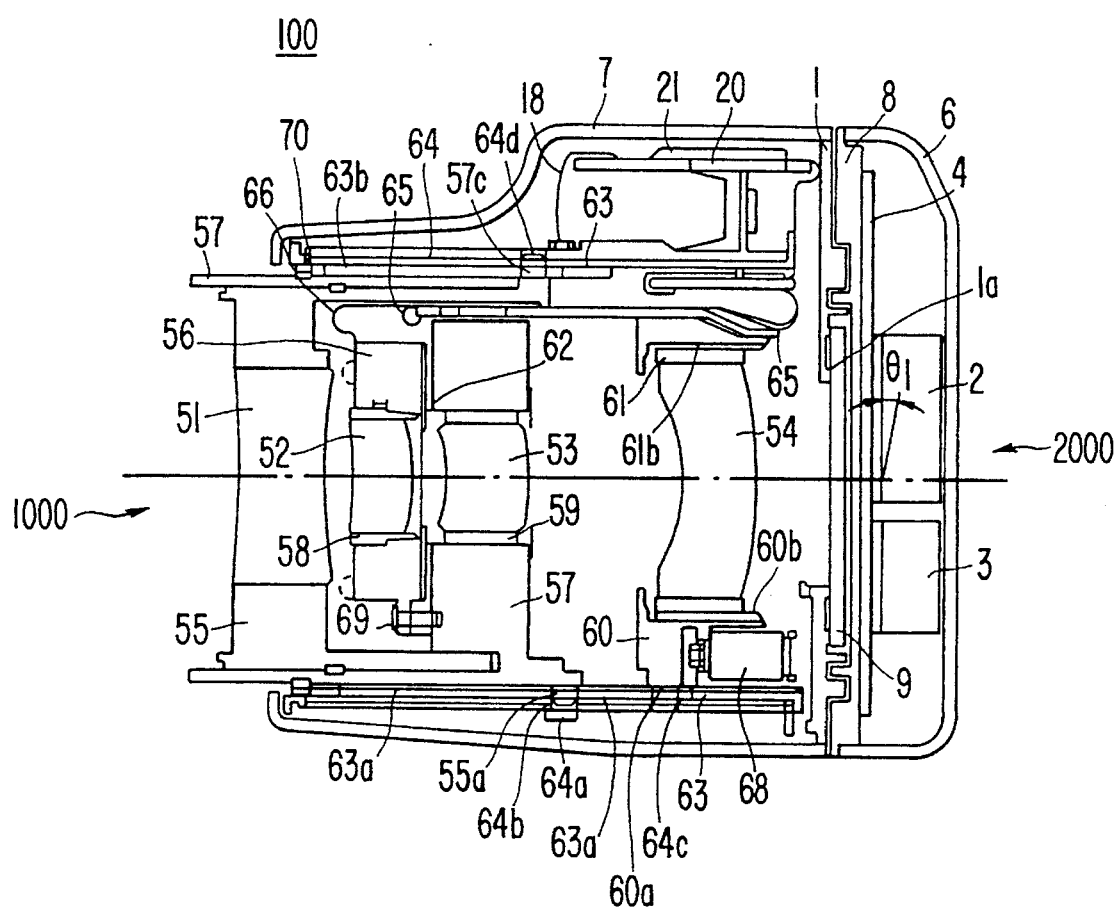
FIG. 3 is a diagram of a side cross-sectional view, along line 3—3 in FIG. 1, of a still camera with a vibration correction function according to an embodiment of the present invention.

Referring now to FIG. 3, a female helicoid screw 60b is formed on lens board 60 and is screwed into male helicoid screw 61b formed at the outer circumference of lens chamber 61. A gear (not illustrated) is formed at the outer circumference of the photographic film side of lens chamber 61. The gear (not illustrated) is engaged with a pinion gear group (not illustrated) and linked with a focusing motor 68. The gear is driven by focusing motor 68 to thereby move lens chamber 61 in the direction of the optical axis (front-to-rear in FIG. 3) to perform focusing.

Shutter drive mechanism 56 is attached to lens board 57 by a machine screw 69 and functions to open and close shutter sectors 62. In FIG. 3, angular acceleration detection sensors 2 and 3 are at an angle of $\Theta 1$ with respect to common board 4. A flexible printed circuit 65 electrically connects CPU 21 and focusing motor 68. A flexible printed circuit 66 electrically connects CPU 21 and shutter drive mechanism 56.

A fixed tube 63 has linear guide holes 63a and 63b formed therein. Cam followers 55a, 57c, 60a of lens groups 51, 52, 53 and 54 interact with linear guide holes 63a and 63b. Cam tube 64 holds lens groups 51, 52, 53 and 54 with its inner wall and keeps the optical axis eccentricity of lens groups 51, 52, 53 and 54 within a specified distance. Cam tube 64 is engaged with the outer circumference of fixed tube 63. Cam tube 64 is prevented from being disengaged from fixed tube 63 by a ring 70. A gear 64a is formed at the outer circumference of cam tube 64. Gear 64a is directly coupled with a zoom motor (not illustrated) by a reduction gear train (not illustrated). With this arrangement, cam tube 64 rotates according to the rotation of the zoom motor. Three cam grooves 64b, 64c and 64d are formed at the inner wall of cam tube 64. Cam grooves 64b, 64c and 64d are engaged with the end conical sections of cam followers 55a, 60a and 57c, respectively. In this manner, lens groups 51, 52, 53 and 54 are moved in the direction of the optical axis in conjunction with the rotation of cam tube 64.

If the vibration directions of camera 100 are the yaw direction (X), pitch direction (Y) and roll direction (Z), a pair of vibration detecting sensors (such as angular acceleration detection sensors 2 and 3) which detect the amount of camera vibration in the camera's yaw direction and the pitch directions are necessary to perform vibration correction during picture taking. If the angular acceleration detection sensors 2 and 3 are at an angle of $\Theta 1$ (see FIG. 3) or $\Theta$ (see FIG. 2), the vibration component of the roll direction (Z) is also detected by the angular acceleration detection sensors 2 and 3.

The vibration component of the roll direction (Z) represents noise in the pitch and yaw directions. Therefore, in order to reduce and control the vibration component of the roll direction (Z), angular acceleration detection sensors 2 and 3 are arranged in the vicinity of the rear of pressure plate 9 and to the rear of the film 24. Pressure plate 9 maintains flatness of film 24 and presses film 24 against photographic image plane exposure aperture 1a so film 24 is arranged at the center of camera body 1. Therefore, angular acceleration detection sensor 2, which detects vibration in the pitch direction (Y), is arranged at the rear of pressure plate 9, and angular acceleration detection sensor 3, which detects vibration in the yaw direction (X), is arranged in a space below angular acceleration detection sensor 2. Angular acceleration detection sensor 2 and angular acceleration detection sensor 3 are mounted on common board 4. CPU 5 controls angular acceleration detection sensors 2 and 3 and is mounted on board 4 in the same manner as angular acceleration detection sensor 2 and angular acceleration detection sensor 3. Common board 4 and pressure plate 9 are installed on parent board 8. Parent board 8 is attached to rear cover 6.

Therefore, angular acceleration detection sensors 2 and 3 are arranged in the center of camera body 1. Angular acceleration detection sensor 2 (which detects vibration in the pitch direction (Y)) is arranged at the rear side of pressure plate 9, inside rear cover 6 and in a lower space which is the size of the image plane exposure aperture 1a. Angular acceleration detection sensor 3 (which detects vibration in the yaw direction (X)) is arranged at the rear side of the pressure plate 9, inside rear cover 6 and also in the lower space. Angular acceleration detection sensors 2 and 3 are mounted on common board 4 so that the roll direction noise component can be reduced.

The present embodiment of the present invention comprises a camera with vibration detecting sensors (such as angular acceleration detection sensors 2 and 3), a pressure plate 9 which supports film 24 at the image plane exposure aperture 1a, wherein the vibration detection sensors are arranged at the rear side of pressure plate 9 and in the vicinity of the center position of camera body 1. In this manner, the noise component in the roll direction (which affects detection in the pitch and yaw directions) can be reduced even in the case where the vibration detection sensors are attached at an angle.

The above embodiment discloses a camera wherein "film" is exposed to light passing through a photographic image plane exposure aperture 1a. However, the present invention is not limited to exposing "film". Any image storage material can be used, such as various types of digital storage material, optical disks, etc.

Photographic lens barrel 50 for the above embodiment of the camera is described as a zoom lens; however, photographic lens barrel 50 can be a non-zoom lens or virtually any type of lens and is not intended to be limited to a zoom lens.

The term "vibration" is used throughout the above description for the preferred embodiment of the camera and is intended to be broadly interpreted. For example, vibration detection and vibration correction refers to the detection and correction of many types of vibrations, including those caused by hand tremors, component noise and component movement. The term "vibration correction" also refers to "blur correction", that is, correcting for blur that occurs when a photograph is taken as a result of camera movement during exposure.

The present invention also is not intended to be limiting to a specific type of camera. For example, the present invention can be applied to analog cameras, digital cameras, video cameras, single lens reflex cameras, zoom lens cameras, etc.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera which photographs an image onto an image storage material by exposing the image storage material through a photographic image plane exposure aperture, the camera comprising:

a retaining member which supports the image storage material at the photographic image plane exposure aperture; and a vibration detecting sensor arranged to the rear of the camera in relation to the retaining member and located approximately at a center position along the width of the camera, the vibration detecting sensor being positioned behind the image storage material when the image storage material is supported by the retaining member.

2. A camera as in claim 1, further comprising first and second vibration detecting sensors, the first vibration detecting sensor being an angular acceleration detection sensor which detects angular acceleration in a first direction and the second vibration detecting sensor being an angular acceleration detection sensor which detects angular acceleration in a second direction, the second direction being perpendicular to the first direction.

3. A camera as in claim 2, wherein the first direction is the yaw direction of the camera and the second direction is the pitch direction of the camera.

4. A camera as in claim 3, further comprising a rear cover positioned at the rear of the camera in relation to the retaining member and forming an enclosure area with the retaining member, the first and second vibration detecting sensors being positioned inside the enclosure area.

5. A camera as in claim 4, further comprising a board positioned at the rear of the camera in relation to the retaining member, the first and second vibration detecting sensors being attached to the board.

6. A camera as in claim 3, further comprising a board positioned at the rear of the camera in relation to the retaining member, the first and second vibration detecting sensors being attached to the board.

7. A camera as in claim 2, further comprising a rear cover positioned at the rear of the camera in relation to the retaining member and forming an enclosure area with the retaining member, the first and second vibration detecting sensors being positioned inside the enclosure area.

8. A camera as in claim 7, further comprising a board positioned at the rear of the camera in relation to the retaining member, the first and second vibration detecting sensors being attached to the board.

9. A camera as in claim 2, further comprising a board positioned at the rear of the camera in relation to the retaining member, the first and second vibration detecting sensors being attached to the board.

10. A camera as in claim 1, further comprising a rear cover positioned at the rear of the camera in relation to the retaining member and forming an enclosure area with the retaining member, the vibration detecting sensor being positioned inside the enclosure area.

* * * * *